US012692826B2

(12) United States Patent
     Haney

(10) Patent No.: US 12,692,826 B2
(45) Date of Patent: Jul. 28, 2026

(54) DEVICE FOR AUTONOMOUS ROCKETRY

(71) Applicant: Brian Haney, Las Vegas, NV (US)

(72) Inventor: Brian Haney, Las Vegas, NV (US)

(73) Assignee: Brian Haney, Las Vegas, NV (US)

( * ) Notice: Subject to any disclaimer, the term of this patent is extended or adjusted under 35 U.S.C. 154(b) by 140 days.

(21) Appl. No.: 18/672,666

(22) Filed: May 23, 2024

(65) Prior Publication Data

US 2026/0036102 A1     Feb. 5, 2026

(51) Int. Cl.
| | |
|---|---|
| *F02K 9/80* | (2006.01) |
| *B64G 1/24* | (2006.01) |
| *F02K 9/52* | (2006.01) |
| *G05B 13/02* | (2006.01) |
| *G05D 1/49* | (2024.01) |
| *G05D 1/644* | (2024.01) |
| *G05D 101/10* | (2024.01) |
| *G05D 109/40* | (2024.01) |

(52) U.S. Cl.
CPC .............. *F02K 9/805* (2013.01); *B64G 1/242* (2013.01); *F02K 9/52* (2013.01); *G05B 13/027* (2013.01); *G05D 1/49* (2024.01); *G05D 1/644* (2024.01); *G05D 2101/10* (2024.01); *G05D 2109/40* (2024.01)

(58) Field of Classification Search
CPC ... F02K 9/80; F02K 9/805; F02K 9/56; F02K 9/94; F02K 9/52; B64G 1/242; B64G 1/244; G05B 13/027; G05D 1/49; G05D 1/644; G05D 2101/10; G05D 2109/40
See application file for complete search history.

(56) References Cited

U.S. PATENT DOCUMENTS

| | | | | |
|---|---|---|---|---|
| 11,353,889 | B1 * | 6/2022 | Freiheit | ............... G05D 1/0088 |
| 12,406,194 | B1 * | 9/2025 | Cosic | ..................... G05D 99/00 |
| 2018/0292826 | A1 * | 10/2018 | DeFelice | ............... A01G 15/00 |
| 2022/0234765 | A1 * | 7/2022 | Haney | .................... G06N 3/092 |
| 2022/0406196 | A1 * | 12/2022 | Freiheit | ................... G08G 5/52 |
| 2023/0249847 | A1 * | 8/2023 | Haney | ..................... B64G 1/36 |
| | | | | 701/13 |
| 2025/0141270 | A1 * | 5/2025 | Oqab | ..................... B64U 10/13 |
| 2025/0165288 | A1 * | 5/2025 | Davies | .................. G06F 9/4881 |
| 2025/0256864 | A1 * | 8/2025 | Catledge | .......... G06Q 10/06312 |
| 2025/0299044 | A1 * | 9/2025 | Fernandes Da Silva | .................... |
| | | | | G06N 3/0985 |
| 2025/0326504 | A1 * | 10/2025 | Haney | .................... B64G 1/244 |
| 2025/0358000 | A1 * | 11/2025 | Rijlaarsdam | ....... H04B 7/18517 |

FOREIGN PATENT DOCUMENTS

| | | | | |
|---|---|---|---|---|
| KR | 20190102142 A | * | 9/2019 | .......... G07C 5/0816 |
| WO | WO-2024226801 A2 | * | 10/2024 | ............. G06Q 50/04 |

OTHER PUBLICATIONS

Donahue, Benjamin B. "Mars Ascent-Stage Design Utilizing Nuclear Propulsion." Journal of spacecraft and rockets 32.3 (1995): 552-558. Web. (Year: 1995).*

* cited by examiner

*Primary Examiner* — Donald J Wallace
*Assistant Examiner* — Keith A von Volkenburg

(57) ABSTRACT

A device for controlling a rocket to account for environmental uncertainties and maintain optimal mission performance. In embodiments, the device is a radiation hardened field programmable gate array with two embedded artificial intelligence programs contained in a graphics processing unit that is used for rocket reaction control by generating thrust vector commands.

1 Claim, 3 Drawing Sheets

DEVICE FOR AUTONOMOUS ROCKETRY

BACKGROUND TO THE INVENTION

Field of the Invention

The field of the present disclosure relates to computing devices for rocket control using intelligent systems. As such, the field of this invention lies at the confluence of two broader fields: rocketry and artificial intelligence. Rocketry involves the study, engineering, and construction of space vehicles launching to Earth orbit. Artificial Intelligence (AI) is a sub-field of computer science focusing on machines making decisions that mirror and replicate the human mind's thoughtful processes.

Background Art

The Cold War ignited a surge in rocket technology development, which advanced rapidly throughout the 1950s and 1960s. In the West, the Apollo Program culminated in one of humanity's greatest achievements. In 1969, Neil Armstrong and Buzz Aldrin became the first humans to set foot on the moon during the Apollo 11 mission. However, humanity has not returned to the Moon since the Apollo 17 mission in 1972.

The decades following the Apollo program focused on developing satellite and orbital infrastructure. Historically, satellites have played a pivotal role in advancing globalization. In fact, the 1970s saw the emergence of consistent global satellite coverage, spurring innovation in both military and commercial fields. Satellites, which are objects in orbit around the Earth, have greatly contributed to this progress. By 1975, around 3,500 objects were detected in Earth's orbit. Indeed, one of humanity's most significant technological achievements is the current network of Earth-orbiting satellites.

Today, over 6,000 satellites are in orbit. The modern satellite infrastructure has become essential to contemporary life, powering telecommunications networks, global positioning systems, and climate monitoring. Consequently, the current Earth-orbiting satellite network stands as one of humanity's most remarkable technological achievements. Most satellites are positioned in one of three orbital zones: geostationary orbit (GEO) at 22,300 miles above sea level; medium Earth orbit (MEO) at 11,000 to 12,000 miles; and low Earth orbit (LEO) at 100 to 1,200 miles. Typically, LEO satellites orbit between 200 and 600 miles, just below the intense radiation of the Van Allen Belts. These networks of satellites and ground stations deliver three primary benefits: global navigation, global communication, and intelligence information.

Launching satellites to orbit required a rapid evolution of rocket technology. Still, despite structural differences, all rockets need an engine to generate thrust for liftoff. As such, rocket propulsion systems apply force to a vehicle which accelerates velocity. Rocket engines generally include a vessel with a nozzle, a combustion chamber with propellant, and an ignition system which ignites the propellant. Additionally, rocket engines may also include a coolant system or protective shield, depending on the engine type.

Additionally, all rockets require a control system to steer their trajectory into space and, in some cases, back to Earth. These control systems include the attitude control system, the reaction control system, and other software-specific systems. The reaction control system manages the rocket's response to its operational environment. Meanwhile, the attitude control system uses vectorized controls to reduce thruster output and adjust the rocket's position. A thruster is a device that generates thrust to propel the rocket forward. During flight, thruster commands are used to control and adjust the rocket's positioning, including roll, pitch, yaw, and overall attitude.

The cutting-edge technology in rocket control hardware is the field programmable gate array (FPGA), an integrated circuit that can be configured by designers after manufacturing. FPGA configurations typically utilize a hardware description language, like the languages used in other integrated circuits. Architecturally, FPGAs consist of an array of programmable logic blocks and reconfigurable connectors that wire these blocks together. This flexibility allows FPGAs to optimize trade-offs between performance, efficiency, and cost in circuit design. Additionally, for space applications, FPGAs must be radiation-hardened to withstand the harsh effects of space radiation.

FGPAs typically have both memory and processing capabilities, to support dynamic programming techniques and operations. In short, FPGAs are modularized logic unit arrays with interconnection resources. The utility for engineers is a configurable array of uncommitted gates with uncommitted wiring channels, which allows for custom application. Each logic unit can be programmed to implement a particular logic function. To implement a particular circuit function, the appropriate connections are programmed for implementation by mapping the circuit to an array and configuring the necessary wiring connections. In fact, logic blocks can be configured to perform complex convolutional functions. For example, an FGPA may be embedded with a convolutional computer program for processing data to allow computer vision.

Central Processing Units (CPUs) and Graphics Processing Units (GPUs) are both essential components in modern computing, but they serve different purposes and excel in different areas. CPUs are designed for general-purpose computing and are optimized for tasks that require sequential processing, making them suitable for a wide range of applications, from running operating systems to executing complex algorithms. GPUs, on the other hand, are specialized for parallel processing, which allows them to handle thousands of simultaneous threads. This capability makes GPUs particularly innovative and effective in the field of machine learning. In machine learning, especially in training large neural networks, the ability to perform many calculations simultaneously is crucial. GPUs excel at this due to their high throughput and ability to perform matrix multiplications and other operations in parallel, significantly speeding up the training process. This innovation has revolutionized machine learning, enabling the development of more complex models and the processing of larger datasets than ever before, which in turn has led to advancements in fields such as image and speech recognition, natural language processing, and autonomous systems.

Rocket sensing systems may include a variety of data sensors such as cameras and LIDAR systems. LIDAR systems include a transmitter and a receiver. The transmitter includes a laser and a beam expander to set the outgoing beam divergence. The receiver includes a telescope to collect backscattered signal, and appropriate optics to direct the return signal from the telescope to a detector, which records the signal. LIDAR sensors transmit infrared light pulses, which travel to the nearest object and backscatter to the receiver to record a measurement. One key challenge in rocketry is to unify rocket sensing systems and intelligent control systems.

Developing as a new stream of research with applications for autonomous control, AI refers to computer systems replicating human thoughtful processes and directed behavior. AI is a field uniquely positioned at the intersection of several scientific disciplines including computer science, applied mathematics, and neuroscience. The AI design process is meticulous, deliberate, and time-consuming-involving intensive mathematical theory, data processing, and computer programming. A specific field within AI, machine learning technologies drive the bleeding edge in innovation.

For computer vision, the state of the art in AI technologies is the Convolutional Neural Network (CNN), a deep learning mechanism for computer vision. The human visual system is the inspiration for the CNNs architectural design. In human vision light enters the eye through the cornea, passing to the lens. As light passes through the lens, the light is convoluted and transferred to the retina. As a mathematical operation, convolution uses two matrices: an input matrix and a kernel. This convolutional operation inspires the architecture for computer vision systems.

Additionally, CNNs contain convolutional layers with learnable parameters. Each kernel is convolved across an input matrix and the resulting output is called a feature map. The full output of the layers is obtained by stacking all of the feature maps to create dimensionality. Classification and state space assignment are common CNN functions. For example, a CNN may classify objects or areas based upon their similarity. In fact, CNNs are specifically used in computer vision because of their ability to map the locality of data. Indeed, a common computer vision data type is data from a Light Detection and Ranging Device ("LIDAR"). In short, LIDAR is a type of optical radar sensor with a transmitter and a receiver, calculating distances and generating environmental data using a laser and the constancy of light speed. CNNs are the cutting edge in computer vision, but reinforcement learning is state of the art in machine decision making.

Reinforcement learning programs comprise three elements: 1) the model, which describes the agent-environment relationship; 2) the reward, representing the agent's goal; and 3) the policy, dictating how the agent makes decisions. In reinforcement learning, the environment represents the problem to be solved, and the agent is an algorithm designed to solve it. The reward serves as a feedback mechanism, enabling the agent to learn independently of human intervention. An optimal policy is typically developed to maximize value, using a training process where the software iterates towards improved performance. This performance is measured by optimal metrics, akin to achieving a high score in a computer game, utilizing a value function.

A value function may be used to compute the value of a given state and action according to a defined policy. In other words, the value function computes the best decision according to a policy. For example, the value function is equal to the expected sum of the discounted rewards for executing policy over the entire environment, called the episode. The expected future rewards are discounted with a discount factor. The discount factor is typically defined between zero and one. If the discount factor is low, the agent considers present rewards to be worth more and if the discount factor is high, future rewards are worth more-relatively speaking.

The objective of reinforcement learning programming is to identify and select the policy that maximizes the expected reward for an agent interacting with an environment. In robotics, this policy can be encoded in a computer program and embedded in hardware for processing and control.

Policy evaluation involves computing the expected reward from executing a policy in a given environment, which is part of a broader process known as policy iteration used to determine an optimal policy. This enables the agent to take actions in real-time according to a defined policy that optimizes control metrics.

Convergent systems are machines capable of sensing their environment and achieving goals, representing the integration of machine decision and perception technologies. Deep reinforcement learning technologies, a specific type of convergent system, are machine learning techniques resulting from a technical convergence in reinforcement and deep learning technologies. Deep reinforcement learning systems have three capabilities that set them apart from all previous AI systems: generalization; learning; and intelligence.

Deep reinforcement learning is a new type of machine learning resulting from the technical convergence of two more mature machine learning methods, deep learning and reinforcement learning. Generally, there are three different frameworks for deep reinforcement learning: q-networks, policy optimizers, and actor-critic. Q-networks are neural networks embedded in the reinforcement learning architecture using q-learning for predicting rewards, a reinforcement learning technique for training agents. Another example, policy optimizers, iterate toward an optimal policy using a neural network to predict policy performance progress. A third deep reinforcement learning variant is the actor-critic framework which uses an actor neural network and critic neural network to optimize an agent's action selection.

Rocket engines, the heart of space exploration, are sophisticated propulsion systems designed to launch spacecraft beyond Earth's atmosphere. These engines operate on principles of Newton's third law, expelling mass at high velocities to produce thrust. The two primary types of rocket engines are chemical and nuclear, each with distinct mechanisms and advantages. Chemical rocket engines, the more traditional and widely used type, generate thrust through the combustion of propellants, offering simplicity and reliability. In contrast, nuclear rocket engines, still largely experimental, leverage nuclear reactions to achieve higher efficiencies and greater specific impulses, making them ideal for deep space missions. Understanding these two main types of rocket engines is crucial for appreciating the advancements and future potential of space travel technology.

Chemical rocket engines are propulsion systems that generate thrust through the exothermic chemical reaction of propellants. These engines typically consist of a combustion chamber where fuel and an oxidizer react, producing high-temperature and high-pressure gases. The rapid expansion of these gases is directed through a nozzle to produce thrust, propelling the rocket forward. Chemical rocket engines are classified into liquid and solid propellant types. Liquid engines offer the advantage of throttle control and restart capability, whereas solid engines are simpler and have higher storage stability. These engines are fundamental to space exploration, providing the necessary force to overcome Earth's gravitational pull and allowing for satellite deployment, crewed space missions, and interplanetary travel. The high energy density of chemical propellants enables rockets to achieve the high velocities required for space missions.

Nuclear rocket engines represent a cutting-edge propulsion technology that harnesses nuclear reactions to produce thrust, offering significant advantages over traditional chemical rockets. In a nuclear thermal rocket (NTR), a nuclear reactor heats a propellant, typically hydrogen, to extremely high temperatures. The heated propellant then expands rapidly and is expelled through a nozzle to generate thrust. This method provides a much higher specific impulse compared to chemical rockets, meaning greater efficiency and the ability to achieve higher speeds. This makes nuclear rockets particularly attractive for deep space missions, where reduced travel time can significantly lower risks to human crews and increase mission feasibility. Nuclear propulsion can also support larger payloads due to its higher efficiency. Despite the potential, challenges such as reactor safety, radiation shielding, and political and environmental concerns about launching nuclear materials must be addressed before nuclear rocket engines can be widely implemented in space exploration.

Rocket engines using liquefied natural gas (LNG) as a propellant represent an innovative approach in modern rocketry, blending the benefits of traditional chemical propulsion with the advantages of a cleaner, more efficient fuel. LNG, primarily composed of methane, offers a high energy density and can be stored at cryogenic temperatures, similar to liquid hydrogen but with greater ease of handling and storage. When paired with an appropriate oxidizer, such as liquid oxygen, LNG engines can achieve high performance, providing significant thrust and efficiency. Additionally, LNG's lower carbon content compared to other hydrocarbon fuels results in reduced soot production, minimizing engine wear and potentially lowering maintenance costs. These characteristics make LNG an attractive option for next-generation rockets, promising not only improved performance but also enhanced sustainability and cost-effectiveness in space missions.

Until the early part of the twenty-first century, rockets were fully expendable, meaning they could only be used once. The major innovation of modern rocket technology is the reusable rocket. This innovation is well displayed in launch price-performance. From a financial perspective, rockets are much like jets because the fuel for a trip is only a small fraction of the cost. Thus, the major cost of launching a payload into orbit is the rocket itself. By making rockets reusable, like jets, the cost-efficiency of spaceflight is experiencing order of magnitude improvements. Reusable rockets significantly reduce the cost per launch, making space more accessible and fostering the growth of new space industries and exploration opportunities.

As rocket technology evolves to support point-to-point, orbital, and extraterrestrial missions, safety in landing rockets is critical. Moreover, rocket landing is a difficult, stochastic, and unpredictable task, especially in environments with inclement weather. Therefore, launch missions are often strictly limited based on weather. Limiting launch based on time windows is expensive, causing delays for contractors and Government agencies.

Current devices and methods for optimizing trajectory for rockets utilize optimization techniques based on deterministic environments but are unable to generalize about changes in dynamic or uncertain environments. Thus, there exists a need for control devices with embedded artificial intelligence software which can generalize about environmental uncertainties, enabling point-to-point rocket control. As such, the present disclosure is tailored toward optimizing rocket control from launch to landing using deep reinforcement learning to maximize safety and landing performance in uncertain environments caused by inclement weather or other dynamics.

SUMMARY OF THE INVENTION

Rocket control is a difficult and unpredictable task in environments with inclement weather. As a result, launch missions are often strictly limited based on weather. However, the problem is there is no way for a rocket's control system to generalize about uncertainty in its environment for instantaneous adjustment. The present invention provides an embedded device with an artificial intelligence computer program for controlling a rocket to account for stochastic dynamics and maintain optimal performance.

In certain embodiments, the present disclosure is a computing device for commanding a reaction control system. The computing device comprises a simulation trained artificial intelligence computer program, embedded in a radiation hardened processor. The radiation hardened processor further comprises at least one graphics processing unit, storing at least one artificial intelligence computer program processing real time sensor data, generalizing about the rocket's trajectory environment, and storing at least one deep learning program to optimize commands for reaction control. The commands controlling thrust vectors for the rocket, wherein wiring connects the radiation hardened processor to the rocket's thrust vectors further comprising a fuel injector, injecting fuel to one or more engines according to the commands produced by the deep learning computer program. The deep learning computer program further comprises at least one neural network.

DETAILED DESCRIPTION OF THE INVENTION

Figure 1:
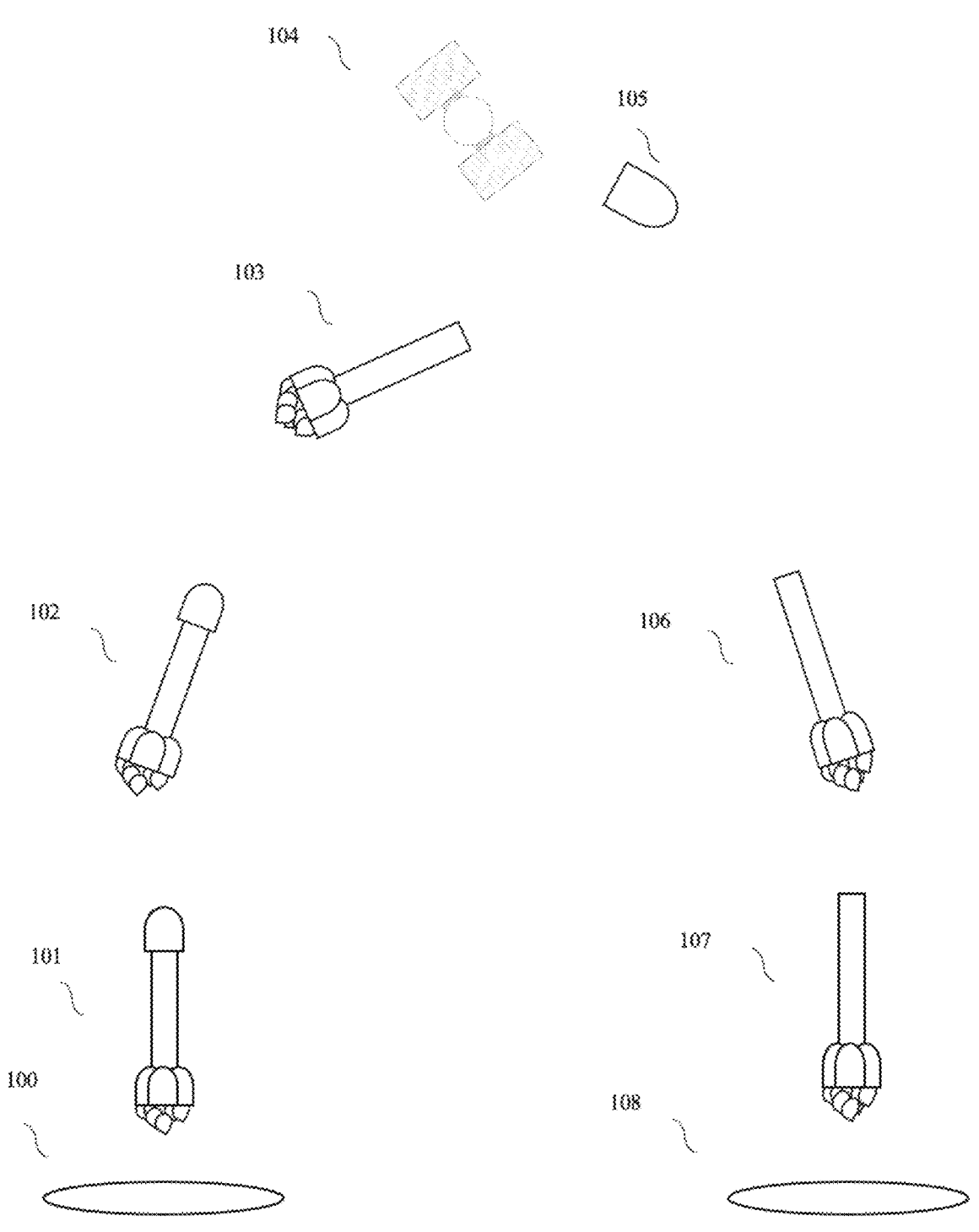
FIG. 1 illustrates embodiments of the present disclosure wherein a device for autonomous rocketry controls a rocket or end-to-end delivery of a satellite to orbit.

FIG. 1 illustrates embodiments of the present disclosure wherein a device for autonomous rocketry controls a rocket or end-to-end delivery of a satellite to orbit. In such embodiments, a rocket 101 starts a launch pad 100. The rocket launches to space 102 and delivers 103 a satellite 104 to orbit, wherein the capsule 105 detaches from the booster stage. The booster stage then returns to Earth 106 and lands safely 107 on the landing pad 108.

Figure 2:
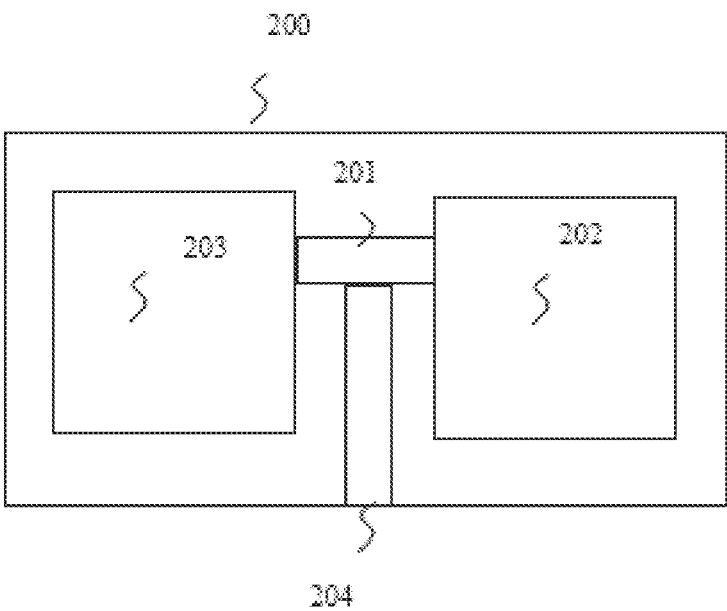
FIG. 2 illustrates embodiments of the present disclosure as a computing device for autonomous rocket control.

FIG. 2 illustrates embodiments of the present disclosure as a computing device for autonomous rocket control. In such embodiments, a radiation hardened processor 200 may use a connection device 201 to combine computation of a CPU 203 and a GPU 202. The processor may connect to incoming and outgoing electrical circuits via a plug-in port 204.

Figure 3:
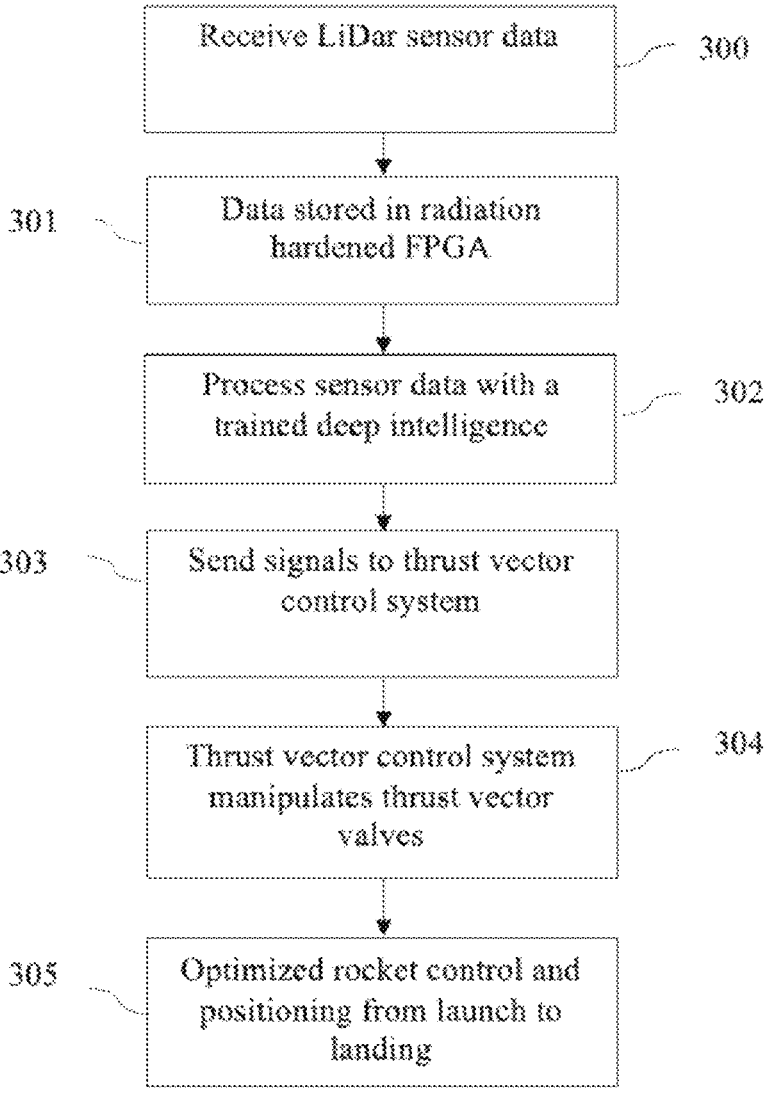
FIG. 3 illustrates the present disclosure as an information flow model for receiving sensor data.

FIG. 3 describes embodiments of the present disclosure as an information flow model for receiving sensor data. In certain embodiments of the present disclosure, an onboard database and processor receive LIDAR sensor data 300 from LIDAR sensors on the rocket. The data is then stored in radiation hardened FPGA 301 which processes the sensor data with a trained deep intelligence 302. The deep intelligence then sends signals to the thrust vector control system 303. In turn, the thrust vector control system manipulates thrust vector valves 304. As a result, the rocket's control is optimized from launch to landing 305.

In certain embodiments of the present disclosure, an onboard database and processor receive LIDAR sensor data 300 from LIDAR sensors on the rocket. The data is then stored in radiation hardened FPGA 301 which processes the sensor data with a trained deep intelligence 302. The deep intelligence then sends signals to the thrust vector control system 303. In turn, the thrust vector control system manipulates thrust vector valves 304. As a result, the rocket's control is optimized from launch to landing 305.

In certain embodiments, a radiation hardened processor 200 may use a GPU 202 with a trained deep intelligence software program 302 to optimize rocket control. In such embodiments, the GPU may produce commands or signals for the thrust vector control system 303. These thrust vector control signals may be used to optimize and ensure a safe rocket landing 107 on a rocket landing pad 108.

In certain embodiments, a radiation hardened processor 200 may use a GPU 202 with a trained deep intelligence software program 302 to optimize rocket control. The GPU may work in conjunction with a CPU 203 to optimize control signal outputs and commands for the reaction control system. The reaction control outputs and commands may be used to optimize and ensure a safe rocket landing 107 on a rocket landing pad 108.

In certain embodiments, a radiation hardened processor 200 may use a GPU 202 with a trained deep intelligence software program 302 to optimize rocket control. The GPU may work in conjunction with a CPU 203 to optimize control signal outputs and commands for the reaction control system. The reaction control outputs and commands may be distributed through wiring and transferred throughout the rocket via a plug-in port connection mechanism 204.

In certain embodiments, the present disclosure is a method for rocket control. In such embodiments, the method includes a rocket with several LIDAR or other data sensors, which record information about the rocket's environment in real time 300. The LIDAR and other data sensors may then transmit the data to a database and processor 301. The processor may in certain embodiments include and embedded machine learning algorithm, using a convolutional neural network to generate an accurate point cloud environment. Additionally, in certain embodiments, the processor may include a second machine learning algorithm, such as a deep reinforcement learning algorithm for producing commands for thrust vector valve manipulation 304.

In certain embodiments, the present disclosure may converge hardware and software components including both a radiation hardened FGPA and a deep reinforcement learning algorithm, which may be fastened in the rocket to control the rocket's thrust output 304. In certain embodiments, electric wiring from the FGPA may carry signals from the deep reinforcement learning control algorithm to fuel injectors throughout the point-to-point journey 303. In such embodiments, the entire trajectory, from launch to landing may be controlled by the deep reinforcement learning control algorithm manipulating thrust vector commands corresponding to thrust output.

In certain embodiments, the present disclosure includes using LiDAR sensors 300 for perception includes convolutional neural networks 302 for generating a digital environment. Programming code for the convolutional neural networks may be written in various programming languages including Python, C, and C++ depending on mission need. The software may be developed in a simulation environment prior to flight and subsequently embedded to the rocket's on-board processor 200.

In certain embodiments, the present disclosure is a device for commanding a reaction control system. The device comprises a simulation trained artificial intelligence program, which operates on a radiation hardened processor 200.

The artificial intelligence program processes real time sensor data and generalizes about the rocket's trajectory environment. Specifically, in certain embodiments, the artificial intelligence program using a deep learning program to optimize commands for end-to-end trajectory. In such embodiments, the artificial intelligence computer program produces commands that control thrust vectors for the rocket. In such embodiments, the thrust vectors also may include a fuel injector, injecting fuel to one or more engines according to the commands produced by the deep learning program 302.

In certain embodiments, a radiation hardened processor 200 may be embedded on a rocket 101. In such embodiments, the radiation hardened processor may control the rocket using an embedded artificial intelligence program on a GPU 202 in conjunction with a CPU 203, as the rocket launches to space 102 and delivers 103 a satellite 104 to orbit.

In certain embodiments, a radiation hardened processor 200 may be embedded on a rocket 101. In such embodiments, the radiation hardened processor may control the rocket using an embedded artificial intelligence program on a GPU 202 in conjunction with a CPU 203, as the rocket returns from orbit 106 and lands 107 on a landing pad 108.

In certain embodiments, the present disclosure utilizes various hardware components. For example, certain embodiments include mounting a radiation hardened field programmable gate array (FGPA) on the rocket, with wiring connections to various thrust chambers. In certain embodiments, the FGPA may contain both a central processing unit and graphics processing unit to perform computations. Commands from the FGPA move to control vector units which may open and close thrust chambers on the rocket, or limit thrust output to a certain degree 304.

In certain embodiments of the present disclosure, the FGPA may be embedded with a deep learning algorithm. The embedded deep algorithm may be expressed as software code written in one of several programming languages, including Python, C, C++ or other machine code. The deep learning algorithm may be trained in a simulation environment before being embedded to the hardware processor. Throughout the mission, the algorithm may correct for differences in the actual flight path and the optimal flight path by issuing commands corresponding to thrust vector control.

In certain embodiments, the present disclosure may include sensors collecting data about the rocket's environment. The sensor data may be processed and stored in the rocket's database, and subsequently processed by convolutional neural networks to create a digital environment. The sensor data may be further processed and manipulated by a reinforcement learning agent, which performs optimal control commands to manipulate rocket trajectory 305.

In certain embodiments, the present disclosure may include the hardware for the rocket may use a niobium alloy metal with a protective heat shield for the rocket body 101. In such embodiments, the inside of the rocket is made up of a chemical propellant engine, with thrust chambers relaying force through a nozzle. The control systems are embedded on a radiation hardened processor 301 with electrical wiring sending signals throughout the rocket 303.

In certain embodiments, the present disclosure may be composed of three parts, reflecting the three flight stages, which include launch 102, powered flight 103, and landing 205. In each stage, a separate software component may control the rocket to optimize safety and performance for point-to-point travel. Moreover, in such embodiments the software stack embedded in the rocket's hardware processors includes convolutional neural networks, reinforcement learning agents, and integrated deep reinforcement learning systems. In embodiments, the disclosure provides a way to unify computer perception and decision-making technologies for point-to-point rocket control in a singular system 302. In doing so, the methods marry software code for deep learning and reinforcement learning technologies which collaboratively control the rocket from liftoff to landing.

In certain embodiments, the present disclosure includes LiDAR sensors gathering real-time data about the rocket's environment which is stored in an on-board database and processed with a deep reinforcement learning algorithm producing instructions to optimize rocket control in uncertain environments including inclement weather conditions. In embodiments, the hardware components for the rocket include embedding LiDAR sensors on the rocket, which gather data relating to the rocket's environment. The data collected is routed to an on-board hardware processor with electrical wiring, which allows the data to be processed to create a virtual environment. Further electrical wiring connects the on-board hardware processor to thrust chamber valves which command and control propellant injectors.

In certain embodiments, the present disclosure may use hardware such as a radiation hardened processor using graphics processing units to process data. For example, certain embodiments include mounting a radiation hardened FGPA on the rocket, with wiring connections to various thrust chambers. The FGPA may contain both a central processing unit and graphics processing unit to perform computations. Commands from the FGPA move to control 301 vector units which may open and close thrust chambers on the rocket, or limit thrust output to a certain degree. The FGPA may be connected throughout the rocket and to sensors with various electrical wirings for transmitting data. Data sensors collecting information may include LiDAR 300, cameras, video, radio, or inertial instruments.

In embodiments the software control system utilizes artificial intelligence programs processing data in real time to command the rocket through space. For example, the point cloud environment may be processed with convolutional neural networks predicting probabilities and assigning associated actions to optimize the rocket's trajectory. In certain embodiments, the digital point-cloud provides real-time data regarding the rocket's environment from liftoff to landing. In processing the point-cloud data, the rocket's software stack iteratively produces commands corresponding to thrust vector controls 304 for manipulating the rocket to ensure safety and efficiency 305.

In certain embodiments of the disclosure, a rocket launches a satellite to orbit 104 and returns to Earth 106. During return, an autonomous control system activates with the push of a button. Once activated, the control system autonomously commands the rocket by processing real time data about the landing zone and adapting the rocket's mechanics, positioning, and trajectory accordingly by manipulating the rocket's thrust vector output 304. Multiple LiDAR sensors, GPS sensors, and inertial navigation sensors on the rocket, landing pad, or other locations like drones or ships, to create a 3D point-cloud environment may record data for processing. In real time, a convolutional neural network identifies the landing zone performing the rocket's vision function. Meanwhile, an embedded reinforcement learning agent maximizes a reward function defining optimal landing metrics including distance, time, and impact trajectory and force.

In certain embodiments, the present disclosure includes a radiation-hardened field-programmable gate array equipped with artificial intelligence playing a critical role in optimizing a rocket's flight path and landing performance, particularly in the harsh conditions of space. These FPGAs are designed to withstand the intense radiation and extreme temperatures encountered in space, ensuring reliable operation. Integrated AI algorithms process vast amounts of real-time data from the rocket's sensors, such as velocity, altitude, and orientation. By analyzing this data, the AI can make rapid, precise adjustments to the rocket's reaction control system. The reaction control system comprises thrusters strategically placed around the rocket and responds to these AI-driven signals to correct the rocket's trajectory and maintain stability. This continuous optimization helps achieve accurate orbital insertion, efficient fuel usage, and safe, and pinpoint landings, enhancing mission success rates and safety.

In certain embodiments, the present disclosure is a computing device for rocket reaction control. The computing device comprises a simulation trained artificial intelligence computer program. The artificial intelligence computing program is embedded on a radiation hardened processor 200. The radiation hardened processor further stores the artificial intelligence computer program processing real time sensor data. The artificial intelligence computer program generalizes about the rocket's trajectory environment. The artificial intelligence computer program optimizes commands for reaction control. The commands for reaction control controlling thrust vectors for the rocket to minimize error in reaction control.

In certain embodiments, the present disclosure is a computing device for rocket reaction control. The computing device comprises a simulation trained artificial intelligence computer program. The artificial intelligence computing program is embedded on a radiation hardened processor. The radiation hardened processor further comprises one graphic processing unit 202. The radiation hardened processor further stores the artificial intelligence computer program processing real time sensor data. The artificial intelligence computer program generalizes about the rocket's trajectory environment. The artificial intelligence computer program further comprises one reinforcement learning program to optimize commands for reaction control. The commands for reaction control controlling thrust vectors for the rocket, wherein wiring connects the radiation hardened processor to the rocket's thrust vectors further comprising a fuel injector. The fuel injector injects fuel to one or more engines according to the commands produced by the reinforcement learning computer program.

In certain embodiments, the present disclosure is a computing device for rocket reaction control. The computing device comprising a simulation trained artificial intelligence computer program. The artificial intelligence computing program being embedded on a radiation hardened processor. The radiation hardened processor further comprising at least one graphics processing unit 202, the radiation hardened processor further storing an artificial intelligence computer program processing real time sensor data. The artificial intelligence computer program generalizing about the rocket's trajectory environment. The artificial intelligence computer program further comprises at least one deep learning program 302 to optimize commands for reaction control. The commands for reaction control controlling thrust vectors for the rocket, wherein wiring connects the radiation hardened processor to the rocket's thrust vectors further comprising a fuel injector. The fuel injector injects fuel to one or more engines according to the commands produced by the deep learning computer program. The deep learning computer program further comprises at least one neural network.

It is to be understood that while certain embodiments and examples of the invention are illustrated herein, the invention is not limited to the specific embodiments or forms described and set forth herein. It will be apparent to those skilled in the art that various changes and substitutions may be made without departing from the scope or spirit of the invention and the invention is not considered to be limited to what is shown and described in the specification and the embodiments and examples that are set forth therein. Moreover, several details describing structures and processes that are well-known to those skilled in the art and often associated with rockets and rocket trajectories or other launch vehicles are not set forth in the following description to better focus on the various embodiments and novel features of the disclosure of the present invention. One skilled in the art would readily appreciate that such structures and processes are at least inherently in the invention and in the specific embodiments and examples set forth herein.

One skilled in the art will readily appreciate that the present invention is well adapted to carry out the objectives and obtain the ends and advantages mentioned herein as well as those that are inherent in the invention and in the specific embodiments and examples set forth herein. The embodiments, examples, methods, and compositions described or set forth herein are representative of certain preferred embodiments and are intended to be exemplary and not limitations on the scope of the invention. Those skilled in the art will understand that changes to the embodiments, examples, methods and uses set forth herein may be made that will still be encompassed within the scope and spirit of the invention. Indeed, various embodiments and modifications of the described compositions and methods herein which are obvious to those skilled in the art, are intended to be within the scope of the invention disclosed herein. Moreover, although the embodiments of the present invention are described in reference to use in connection with rockets or launch vehicles, ones of ordinary skill in the art will understand that the principles of the present inventions could be applied to other types of aerial vehicles or apparatus in a wide variety of environments, including environments in the atmosphere, in space, on the ground, and underwater.

The invention claimed is:

1. A computing device for a rocket's reaction control comprising at least two artificial intelligence computer programs, the computing device comprising:

a radiation hardened processor comprising at least one graphics processing unit and at least one central processing unit, the radiation hardened processor further storing a first artificial intelligence computer program, wherein wiring connects the radiation hardened processor to the rocket's thrust vectors further comprising a fuel injector, the fuel injector injecting fuel to one or more engines according to commands produced by the first artificial intelligence computer program, the first artificial intelligence computer program being a simulation trained and containing a plurality of neural networks for processing real-time sensor data, including at least one convolutional neural network for processing camera data, at least one convolutional neural network for processing LiDAR data, and at least one convolutional neural network for processing GPS data, wherein, the data processed by the plurality of neural networks are synthesized through a point cloud generation mechanism, aggregating the output of the at least one convolutional neural network for processing camera data, the at least one convolutional neural network for processing LiDAR data, and the at least one convolutional neural network for processing GPS data, the first artificial intelligence computer program further generalizing about the rocket's trajectory environment and producing labelled visual data by processing a synthesized real-time sensor data through a sensor fusion mechanism for the purpose of automating computer vision, a second artificial intelligence computer program comprising at least one reinforcement learning program, processing the labelled visual data and producing optimal commands for reaction control, controlling the rocket's thrust vectors to minimize error, wherein the at least one reinforcement learning program utilizes a trained proximal policy optimization algorithm as a mechanism for policy selection, the policy selection mechanism being deployed for action selection in a continuous state space, the second artificial intelligence program further controlling thrust vectors, by the trained proximal policy optimization algorithm selecting actions in a continuous state space, to manipulate the rocket's thrust control and steer the rocket's pitch, attitude, roll, and yaw, and the second artificial intelligence program further comprising a deep reinforcement learning computer program optimizing control metrics corresponding to distance, time, and impact via an explicit reward function.

\* \* \* \* \*